No. 619,137. Patented Feb. 7, 1899.
W. A. CASNER.
NUT LOCK.
(Application filed Oct. 1, 1898.)
(No Model.)
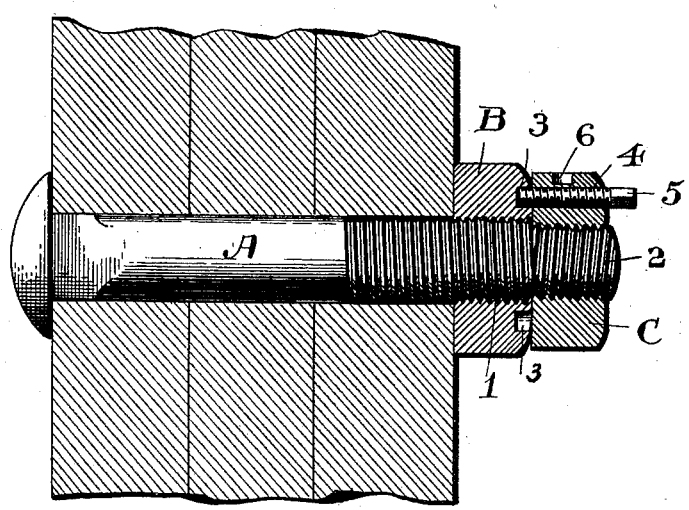
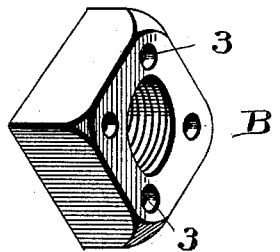
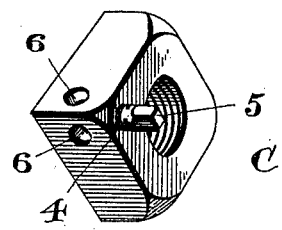
Witnesses
Inventor
William A. Casner
Attorneys

UNITED STATES PATENT OFFICE.

WILLIAM A. CASNER, OF EARLVILLE, ILLINOIS.

NUT-LOCK.

SPECIFICATION forming part of Letters Patent No. 619,137, dated February 7, 1899.

Application filed October 1, 1898. Serial No. 692,394. (No model.)

*To all whom it may concern:*

Be it known that I, WILLIAM A. CASNER, a citizen of the United States, residing at Earlville, in the county of La Salle and State of Illinois, have invented certain new and useful Improvements in Nut-Locks, of which the following is a specification.

My invention relates to an improvement in nut-locks, and has for its object the secure and effectual fastening of a nut upon a bolt or screw, whereby accidental displacement is absolutely prevented and casualties resulting from such displacement are in consequence avoided.

A further object is to provide a nut-lock of simple construction which can be easily applied to any bolt or screw in use requiring or employing a nut or lock at a trifling cost.

With these objects in view my present invention consists in a bolt or screw having right and left threads of different diameters in connection with a pair of nuts, one of which screws to the right and the other to the left, respectively, upon the two threads, and means passing through one nut and into the other for locking the two nuts together, whereby the possibility of either working loose is precluded.

The invention further consists in a bolt or screw having right and left threads in connection with two nuts, one to screw to the right on one thread and the other to the left on the other thread, and a screw which passes into the two nuts, whereby they are securely locked together.

It still further consists in a screw or bolt having right and left threads, in combination with nuts which turn in opposite directions upon the two threads, and a locking device for securing the two nuts together and which is adapted to be upset when driven home, whereby to prevent its accidental removal.

My invention still further consists in the combination, with right and left threads, of nuts to screw on said threads, said nuts having holes therein, and a screw which passes through one nut into the other, said former nut having a depression or depressions in the body of the nut adjacent to the screw, in which a punch is inserted for upsetting the screw after it has been driven home.

In the accompanying drawings, Figure 1 is a longitudinal sectional view of a bolt, showing my improved lock applied; and Figs. 2 and 3 are detached views of the two nuts employed to form the lock.

A represents a bolt or screw having right and left screw-threads 1 and 2, respectively, the outer threads 2 being of a smaller diameter than the inner threads 1.

B and C are the two nuts employed, which, together with their accessories, constitute the lock. Nut B is screwed on the larger threads, it passing freely over the others, and is secured against the part or parts to be bolted. This nut preferably has one or more holes or recesses on its outer face, as indicated at 3. The other nut C screws in the opposite direction upon the smaller thread until it is tight against nut B. Means are now employed for securing these two nuts together, as in that way any movement is impossible. This I accomplish by drilling a hole through the stock of the outer nut in such juxtaposition relative to the center of the nut that it will assume a position over the or one of the recesses or holes 3 in the outer face of nut B. In this hole 4 a screw, if the hole is threaded, or a pin, if not, 5 is inserted, and the latter is forced inward until it reaches into the hole or recess 3 in nut B beneath it, after which this screw or pin is upset. The upsetting may be accomplished in either of two ways, preferably by inserting a punch in one of the depressions 6 6 on the edge of nut C opposite the hole 5 and giving a smart stroke until the threads are sufficiently displaced to prevent the turning of the screw, or, if a pin, until it is jammed until its removal cannot take place. Another way of upsetting would be one or more strokes upon the outer nut and the screw or pin. This latter method would work in a fairly-satisfactory method, although, as stated, the other plan is preferred.

A lock of this construction is not only simple and cheap, but it leaves nothing on the outside to be broken or removed, and it virtually offers a lock which cannot be broken by the constant jarring which so commonly causes displacement of rolling-stock on rail-joints. Other advantages have been previously mentioned which need hardly be repeated.

It is evident that modifications might be made in the form and arrangement of the parts described without departing from the spirit and scope of my invention, and hence I do not wish to limit myself to the exact construction herein set forth; but,

Having thus described my invention, what I claim as new, and desire to secure by Letters Patent, is—

1. A nut-lock consisting of a bolt, two nuts and a device passing into both of said nuts whereby they are secured together, said device being upset when in place.

2. A nut-lock consisting of a bolt, two nuts, and a device passing through one nut and into the other, said device being upset when in place.

3. A nut-lock consisting of a bolt, a right and a left nut and a screw or pin passing into said nuts and upset when in place.

4. A nut-lock consisting of right and left nuts and a screw or pin passed through one nut into the other, the nut through which the pin or screw is passed being upset at a point in its outer surface over the screw whereby to upset the pin or screw beneath it.

5. A nut-lock consisting of right and left nuts and a screw or pin passed through one nut into the other, the nut through which the pin or screw is passed having a depression adjacent to and over the hole through which the pin or screw passes said depression being adapted to receive a punch whereby the pin or screw is upset when in place.

6. The combination with a screw or bolt having right and left threads of different diameters, of two nuts, one to screw in one direction on one thread and the other to screw in the opposite direction on the other thread, and a screw passed through one nut into the other, and upset when in position.

WILLIAM A. CASNER.

Witnesses:
J. S. SPALDING,
M. I. CARTER.